United States Patent [19]
Gilling

[11] Patent Number: 5,749,426
[45] Date of Patent: May 12, 1998

[54] APPARATUS AND METHOD FOR CRUISE CONTROL

[75] Inventor: Simon Peter Gilling, Milton Keynes, England

[73] Assignee: Lucas Industries Public Limited Company, Solihull, United Kingdom

[21] Appl. No.: 571,302

[22] Filed: Dec. 12, 1995

[30]  Foreign Application Priority Data

Dec. 13, 1994 [GB] United Kingdom ............... 9425057

[51] Int. Cl.$^6$ .................................................. B60K 31/00
[52] U.S. Cl. ................... 180/167; 180/170; 364/426.044
[58] Field of Search ................................ 180/167, 169, 180/170; 364/426.044

[56]  References Cited

U.S. PATENT DOCUMENTS 3,689,882  9/1972  Dessailly ............................. 180/169
5,014,200  5/1991  Chundrlik et al. ................... 180/167

FOREIGN PATENT DOCUMENTS 484995      5/1992  European Pat. Off. ............ 180/170
0 612 641   8/1994  European Pat. Off. .
4003205     8/1991  Germany ........................... 180/167
4-201643    7/1992  Japan ................................ 180/169

*Primary Examiner*—Brian L. Johnson
*Assistant Examiner*—Frank Vanaman
*Attorney, Agent, or Firm*—Oblon, Spivak, McClelland, Maier & Neustadt, P.C.

[57]  ABSTRACT

An AICC cruise control system which operates in accordance with a driver's headway request given in terms of a desired time interval between the controlled vehicle and the preceding (target) vehicle, wherein, upon slowing of the target vehicle towards zero velocity, the calculated station of the controlled vehicle behind the target is changed from being a pure time-based interval into a time interval which is calculated to include a proportion of a desired residual range at standstill, the proportion being dependent upon the velocity of the controlled vehicle.

1 Claim, 3 Drawing Sheets

APPARATUS AND METHOD FOR CRUISE CONTROL

The present invention relates to an apparatus for and method of cruise control for vehicles.

It is well known to provide cruise control facilities in a vehicle which allow the driver to set a target vehicle speed, the vehicle road speed being adjusted automatically by the cruise controller so as to maintain the actual vehicle speed at the target speed for as long as the cruise control is activated. Such known controllers do not monitor the distance to or speed of vehicles which lie ahead of the controlled vehicle, so that the driver must intervene if the vehicle under cruise control approaches too closely to a vehicle ahead of it, for example to ensure that a "safe", braking distance remains between the vehicles based on such factors as the driver's perception of the road conditions, weather conditions and vehicle performance. The driver intervention can involve adjusting the set target speed to a new target or at least temporarily switching off the cruise control altogether, for example by applying the vehicle foot brake or displacing a cruise control operating lever to an off position. In the case that a vehicle ahead increases its speed, the driver of the vehicle under cruise control also has the facility to manually adjust the target speed upwardly to a new target by actuation of the cruise control operating lever.

A recent development in cruise control has involved reducing the necessity for driver involvement by enabling the cruise control system to be aware of and react to the presence and performance of a vehicle, referred to hereinafter as a target vehicle, running ahead of the vehicle under cruise control. A system of this type, referred to as one having Autonomous Intelligent Cruise Control (AICC), is disclosed in our EP-A-0 612 641 to which reference is hereby directed, wherein the cruise control apparatus comprises distance error determining means for determining a distance error as the difference between a desired distance between a target vehicle and the controlled vehicle and the actual distance between the target vehicle and the controlled vehicle, speed error determining means for determining a speed error as the difference between the speed of the target vehicle and the speed of the controlled vehicle, and acceleration demand producing means for producing a vehicle acceleration demand as a function of the distance error and of the speed error.

The acceleration demand can be calculated as the sum of the product of the distance error and a first gain parameter and the product of the speed error and a second gain parameter. The second gain parameter may be a constant, such as unity.

The distance and speed errors can be determined in a number of ways for example using an electro-magnetic or ultra-sonic radar system for providing a direct measure of distance to a target vehicle ahead. The speed error can be obtained by differentiating the output of the radar system with respect to time. In other systems, the speed error may be formed automatically by the radar system, for example if the radar system is of the doppler type.

A preferred embodiment of the known system of EP-A-0 612 641 also includes desired distance determining means for determining the desired distance as a function, for example a linear function, of the vehicle speed. It also preferably includes an acceleration error producing means for producing an acceleration error as the difference between the calculated acceleration demand and the actual vehicle acceleration.

The apparatus of EP-A-0612 641 also includes a gating means for supplying the acceleration error to a vehicle drive system when the acceleration demand is greater than a first threshold ($\geq 0$), and for supplying the acceleration error to the vehicle brake system when the acceleration demand is less than the second threshold, the distance error is less than a second predetermined distance error (<0), and the speed error is less than a second predetermined speed error (<0).

Thus, a cruise control system of the type disclosed in our EP-A-0 612 641 can determine the running speed of a controlled vehicle by reference to the relative speed and relative distance of a target vehicle which is running ahead of the controlled vehicle on the road. If the target vehicle increases its speed, then the controlled vehicle will increase its speed correspondingly, up to the preset target speed initially set by the driver. Likewise, if the target vehicle slows down, then the controlled vehicle will be caused to slow down as well, either by reduction in throttle or by a reduction in throttle and by application of the vehicle brakes. If the target vehicle comes to a halt, then the controlled vehicle will also be brought to a halt, a predetermined distance behind the target vehicle.

A problem arises in this connection as to how to establish the latter predetermined headway (distance) at which the controlled vehicle should be brought to rest behind a target vehicle which has itself come to a halt in front of the controlled vehicle. If this predetermined distance is determined purely in proportion to the selected headway set by the driver for operation under running conditions, then as the velocity of the vehicle under cruise control tends towards zero, the headway in seconds tends to infinity and therefore a meaningful desired range to the target vehicle cannot be calculated on headway in time. The result is that the controlled vehicle has difficulty in establishing how to establish its slowing and stopping manoeuvre in relation to the target vehicle.

It is an object of the present invention to establish a solution to this problem.

In accordance with the present invention, there is provided an AICC cruise control system which operates in accordance with a driver's headway request given in terms of a desired time interval between the controlled vehicle and the preceding (target) vehicle, wherein, upon slowing of the target vehicle towards zero velocity, the calculated station of the controlled vehicle behind the target is changed from being a pure time-based interval into a time interval which is calculated to include a proportion of a desired residual range at standstill, the proportion being dependent upon the velocity of the controlled vehicle.

This ensures that an adaptable station distance between the vehicle and its target is maintained at standstill and that this distance is dependent upon the driver's headway request, i.e. if the driver asks for a large time interval (headway request) then at standstill the spacing (residual desired range) between the controlled vehicle and the target is larger than in the case of a smaller requested time interval.

In a preferred embodiment, the changeover from the calculation of the desired range being a pure time-based interval into a time interval which includes a proportion of the desired residual range at standstill is arranged to merge blend headway desired range into residual desired range as velocity, and hence headway desired range, decreases.

A preferred method of operation for achieving this effect is to arrange that the desired range targeted by the system is selected to be equal to the headway desired range (corresponding to the driver-selected desired headway in seconds X the controlled vehicle velocity) unless the headway desired range falls below approximately two times the residual desired range, in which case the desired range targeted by the system is selected to be calculated from the expression:

$$\text{Desired Range} = \left(2 \times RD\text{ Range} - \frac{HD\text{ Range}}{2}\right) + HD\text{ Range}$$

The invention is described further hereinafter, by way of example only, with reference to the accompanying drawings, in which.

Figure 1:
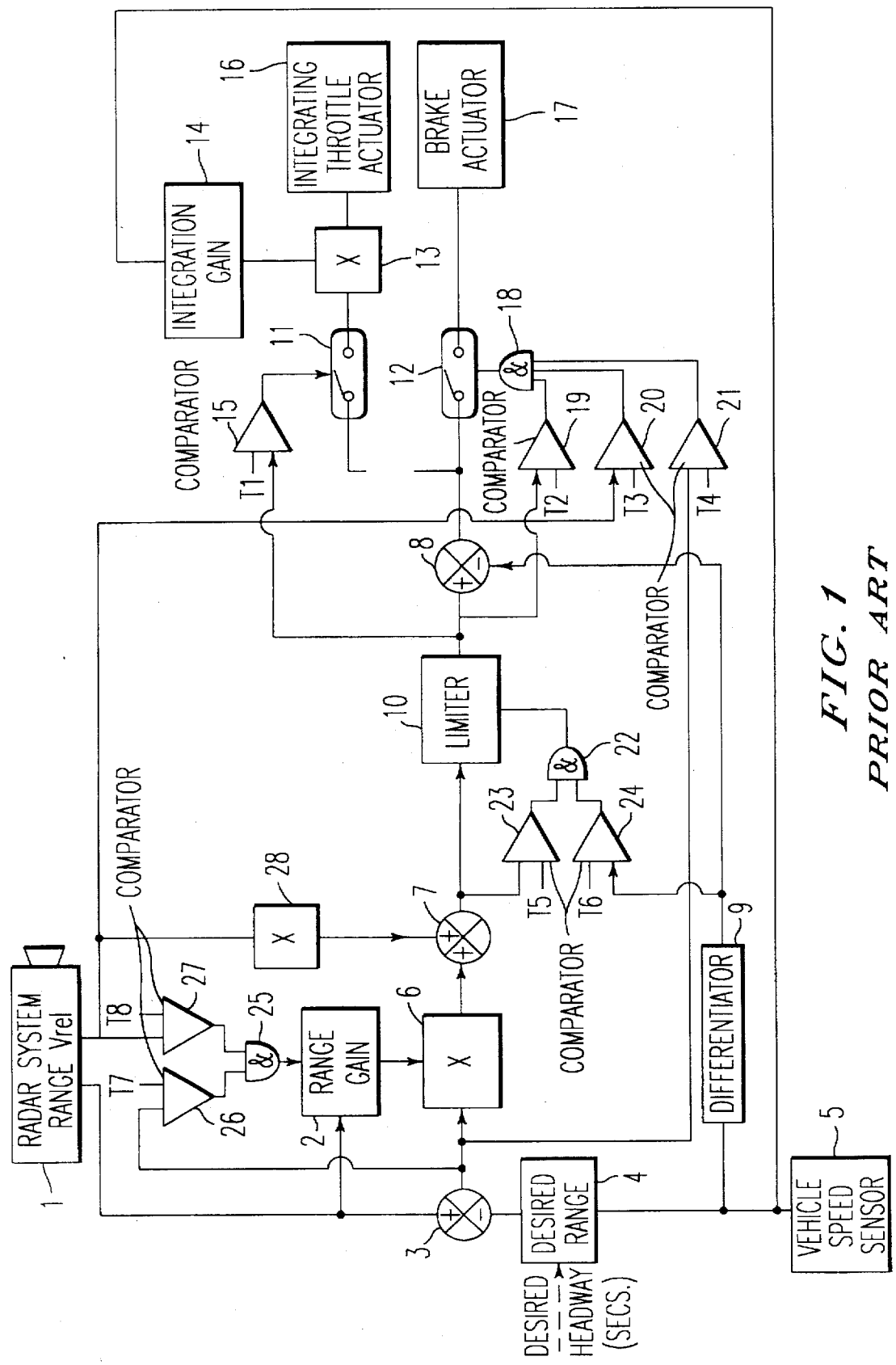
FIG. 1 is a block circuit diagram of one embodiment of a known cruise control apparatus to which the present invention is applicable.

The apparatus of FIG. 1 is identical to that of our earlier EP-A-0 612 641 and reference to that prior document is hereby directed for a full explanation of the illustrated system. Only those parts of the full description from EP-A-0612 641 are included herein as are necessary for a basic understanding of the operation of the illustrated system.

The cruise control apparatus shown in FIG. 1 is provided in a vehicle driven by an internal combustion engine and comprises a radar system 1 which is mounted at the front of the vehicle and faces forwards so as to detect a further vehicle ahead of the vehicle. The radar system 1 provides a range output corresponding to the distance between the vehicle and the further vehicle and a relative speed output Vrel which corresponds to the difference in speeds of the vehicle and the further vehicle.

The range output of the radar system 1 is supplied to the adding input of a subtracter 3. The subtracting input of the subtracter 3 is connected to the output of a desired range setting circuit 4 whose input is connected to a vehicle speed sensor 5 for determining the speed of the vehicle. The sensor 5 may comprise any suitable sensor, such as an optical speed over ground sensor or a system for determining vehicle speed based on measurement of wheel speeds.

The output of the subtracter 3 is supplied to a first input of a multiplier 6 whose second input is connected to the output of a range gain setting circuit 2 having an input connected to the range output of the radar system 1. The output of the multiplier 6 is connected to a first input of an adder 7 whose second input is connected to the radar system 1 via a multiplier 28 so as to receive the relative speed signal. The multiplier is arranged to scale the relative speed signal prior to use by the adder 7. The multiplier 28 may be omitted if a gain of unity is applied to the relative speed signal. The output of the adder 7 is connected to the input of limiter 10 for limiting the maximum positive and negative values of the acceleration demand signal. For instance the maximum positive acceleration may be limited so as to be less than or equal to 15% g and the maximum deceleration may be limited so as to be less than or equal to 30% g, where g is acceleration due to gravity. The limited acceleration demand signal from the limiter 10 is supplied to the adding input of a subtracter 8 whose subtracting input is connected to the output of a differentiator 9. The input of the differentiator 9 is connected to the vehicle speed sensor so that the differentiator 9 provides a signal corresponding to the vehicle acceleration.

The output of the subtracter 8, which represents an acceleration error signal, is supplied to a gating arrangement comprising electronic switches 11 and 12. The switch 11 selectively connects the output of the subtracter 8 to a first input of a multiplier 13 whose second input is connected to the output of an integration gain setting circuit 14. The input of the circuit 14 is connected to the output of the vehicle speed sensor 5. The switch 11 is controlled by a comparator 15 having a first input connected to the output of the limiter 10 and a second input connected to receive a first threshold T1 which corresponds to an acceleration error which is normally greater than zero. The output of the multiplier 13 is connected to the input of a throttle actuator 16 of the internal combustion engine of the vehicle. The throttle actuator is of the type which controls the engine throttle in accordance with the integral with respect to time of the signal supplied thereto.

The switch 12 selectively connects the output of the subtracter 8 to a brake actuator 17 of the vehicle. The switch 12 has a control input connected to the output of an AND gate 18 having three inputs. The first input is connected to the output of a comparator 19 having a first input connected to the output of the limiter 10 and a second input connected to receive a threshold T2 corresponding to an acceleration which is less than zero. The second input of the gate 18 is connected to a comparator 20 having a first input connected to the radar system 1 so as to receive the relative speed signal and a second input connected to receive a threshold T3 corresponding to a relative speed or speed error which is less than zero. The third input of the gate 18 is connected to the output of a comparator 21 which has a first input connected to the output of the subtracter 3 so as to receive a range error signal and a second input connected to receive a threshold T4 corresponding to a range or distance error which is less than zero.

The limiter 10 has a disabling input for preventing the limiter from limiting the acceleration demand signal to the predetermined maximum limit value. The disabling input is connected to the output of an END gate 22 which has two inputs. The first input of the gate 22 is connected to the output of a comparator 23 having a first input connected to the output of the adder 7 and a second input for receiving a threshold T5 corresponding to an acceleration demand which is equal to the maximum or upper limit value of the limiter. The second input of the gate 22 is connected to the output of a comparator 24 having a first input connected to the output of the differentiator 9 and a second input for receiving a threshold T6 corresponding to an acceleration between zero and the upper limit value.

The range gain setting circuit 2 has an input connected to the output of an AND gate 25 having two inputs. The first input of the gate 25 is connected to the output of a comparator 26 having a first input connected to the output of the subtracter 3 and a second input for receiving a threshold T7 corresponding to a predetermined distance error which is greater than zero. The second input of the gate 25 is connected to the output of a comparator 27 having a first input connected to receive the relative velocity signal from the radar system 1 and a second input for receiving a threshold T8 which corresponds to a predetermined speed error which is greater than zero.

When cruise control is selected, the cruise control apparatus shown in FIG. 1 controls the engine throttle and vehicle brake system automatically unless and until cruise control is disabled, for instance by the driver switching off cruise control or operating the accelerator or brake controls of the vehicle. The radar system 1 supplies range and relative speed signals corresponding to the distance between the vehicle and the closest other vehicle ahead of it and the difference between the speeds of the two vehicles. The range is supplied to the subtracter 3. The subtracter 3 forms a range error signal by subtracting the actual range from a desired range generated by the circuit 4. The circuit 4 sets the desired range as a function of the vehicle speed measured by the sensor 5. The circuit 4 may comprise a look-up table stored in a read only memory or a calculating circuit for calculating values of the function based on the vehicle speed. For instance, the desired range S may be determined in accordance with $$S=(0.23\times V)+7$$

where the desired range S is given in meters and V is the vehicle speed in kph.

In the absence of the constant 7 meters, the vehicle would be arranged to follow the further vehicle with a time separation of 0.83 seconds. However, for increased flexibility, the desired range setting circuit 4 may be controllable by the driver so as to select any time separation, and hence desired range, within predetermined limits, for instance of 0.8 and 2.5 seconds. The constant 7 meters ensures that, for relatively low speeds, the vehicle maintains a minimum spacing from the further vehicle ahead of it so that, for instance, if the further vehicle were to stop, the vehicle in cruise control would stop with a desired range sufficient to prevent a collision.

The range or distance error from the subtracter 3 is multiplied in the multiplier 6 by a range gain which is set in the circuit 2. The circuit 2 may comprise a look-up table stored in read only memory or means for calculating the range gain primarily as a function of the actual range or distance between the two vehicles. The range gain may, for example, have a maximum value of 7 for target ranges below 6 meters and a minimum value of 1 for target ranges above 20 meters. Between 6 and 20 meters, the range gain decreases monotonically and continuously or substantially continuously.

The output of the multiplier 6 is added to the speed error signal by the adder 7, that is, in this embodiment, the multiplier 28 has a gain of one. Thus for target ranges of 20 meters and above, the relatively low range gain of 1 is applied to the distance error and the speed error therefore has more influence on cruise control. Even with the relatively low range gain, if the distance error persists for a substantial time, the integral action of the throttle actuator 16 corrects the distance error smoothly.

For relatively small desired ranges, a quicker response to distance error is required and the gain is progressively increased for desired ranges below 20 meters until it reaches the maximum value of 7 at 6 meters and below. For such small desired ranges, any distance error represents a relatively large proportion of the desired range and a quick response is required in order to remove the distance error and, for instance, prevent the vehicle from approaching too closely the further vehicle ahead of it.

Thus, for relatively small desired ranges, the distance error has substantially more influence than the speed error in controlling the vehicle.

When the output of the gate 25 is active, a signal is supplied to the second input of the circuit 2 which causes the circuit to halve the range gain set in accordance with the function. The comparator 26 detects when the distance error is relatively great so that the vehicle under cruise control is relatively far behind the vehicle ahead of it. The comparator 27 determines when the speed error is such that the vehicle under cruise control is closing on the vehicle ahead of it. Thus, when the controlled vehicle is closing but is relatively far behind the lead vehicle, the range gain is halved so as to prevent overshoot.

The gating arrangement comprising the switches 11 and 12 the comparator 15 and the comparator 19 via the gate 18 ensure that positive acceleration demands control the engine throttle whereas negative acceleration demands control the vehicle brake. The thresholds T1 and T2 may be made substantially equal to zero or may be made positive and negative, respectively, by predetermined amounts so as to provide a "dead band" between throttle control and brake control.

The output of the adder 7 represents an acceleration demand signal which itself could be used to control acceleration of a vehicle by being suitably processed and applied, for instance to the throttle actuator 16 and the brake actuator 17. However, in order to provide closed loop control of acceleration, the acceleration demand is compared with the actual vehicle acceleration in the subtracter 8 to form an acceleration error. The acceleration demand from the adder 7 is limited by the limiter 10 to a maximum value of +15% g and a minimum value of −30% g. These maximum values of acceleration and deceleration have been found to be advantageous for the comfort of passengers in the vehicle.

In the known system of our earlier EP-A-0612 641, the "desired range" to the target vehicle ahead is established by the Desired Range setting means 4, by calculation using the vehicle speed or using a look-up table. However, in more sophisticated versions, the desired range can be pre-selected by the driver in terms of a desired headway (in seconds). Thus, the driver can select whether he wishes to be spaced from the target vehicle by say 1.5 seconds, 2 seconds, 2.5 seconds etc. The variability of the desired headway is indicated on FIG. 1 by the dashed line input to the Desired Range box 4.

In normal cruise controlled mode, the minimum operational speed may be set to a particular value, usually 40 kph; this minimum speed allows a desired range from the preceding (target) vehicle to be calculated by the system using desired headway in seconds and the current speed of the controlled vehicle.

However, as the vehicle velocity slows down below 40 kpm and tends towards zero, then the headway in seconds tends to infinity so that meaningful desired range (at standstill) to the preceding vehicle cannot be calculated on the basis of desired headway (seconds) X controlled vehicle velocity (m/s).

When the controlled vehicle velocity has been reduced to zero, then a residual distance should remain between the controlled vehicle and the preceding (target) vehicle. This residual distance at rest should relate to the driver selected headway (spacing). For example a 1.5 second desired headway might result in a desired range at rest of five meters whereas a 2 second headway would result in a somewhat larger desired range at rest.

Figure 3:
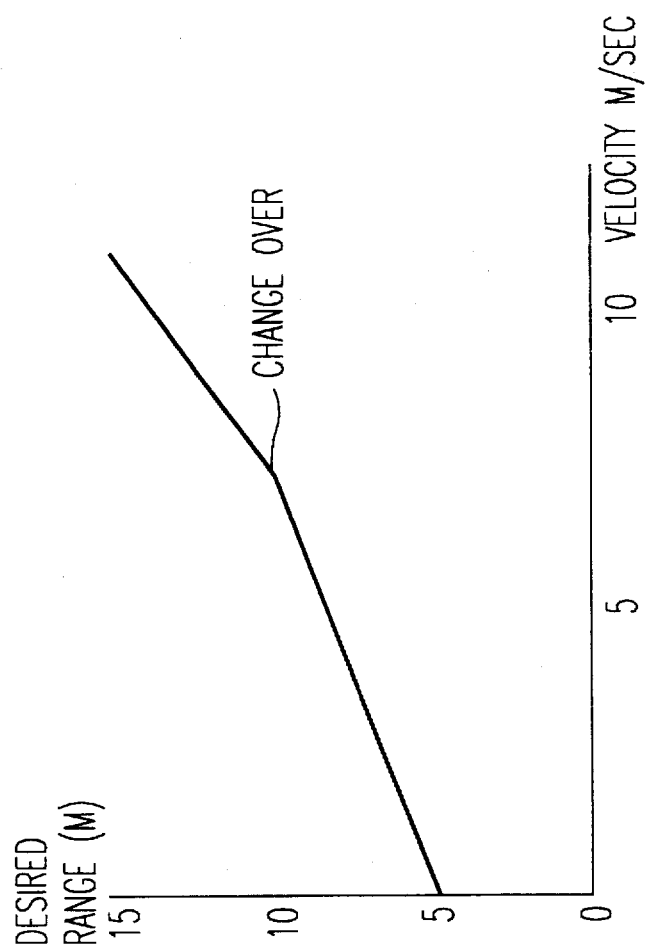
FIG. 3 is a graph illustrating a changeover position utilised in the apparatus of the present invention.

Thus, it is necessary for there to be a transition at some point between basing the spacing of the controlled vehicle from the preceding vehicle on the desired headway spacing (at speed) and in the residual desired range (at rest) (see FIG. 3).

The present invention provides a means whereby, as the cruise control vehicle moves from the higher speed (headway) desired range (HD Range) to the lower speed (residual) desired range (RD Range), the desired range calculation merges headway (in seconds) into residual range (in meters) as the velocity, and hence headway desired range, decreases.

Figure 2:
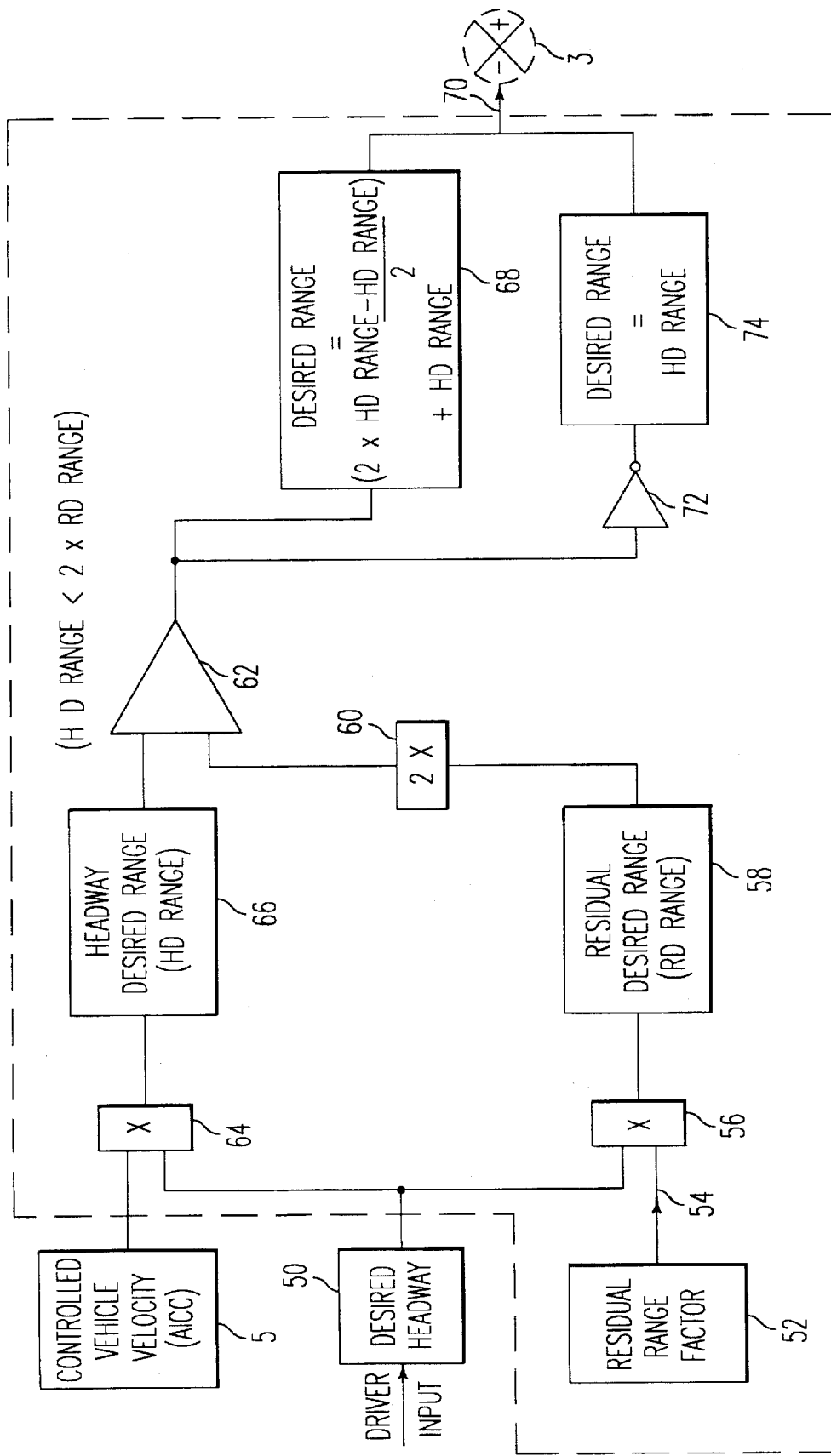
FIG. 2 is a block diagram illustrating one embodiment of a modified Desired Range forming apparatus in accordance with the present invention.

This is achieved in a preferred embodiment using the arrangement illustrated diagrammatically in FIG. 2 to which reference is now directed.

The driver can select a desired headway to be adopted by the system when the vehicle is under normal cruise control, i.e. it is operating at a velocity in excess of 40 kph. This desired headway is manually input to a desired headway element 50 which supplies a signal representative of the desired headway to a residual range factor element 52 which establishes a residual range factor on its output line 54 which increases in proportion to the desired headway. However, the proportion by which the range factor increases with desired headway reduces as the desired headway increases.

The driver selected desired headway from element 50 and the residual range factor from element 52 are multiplied together in a multiplier 56 to form the Residual Desired Range in element 58. The value of the Residual Desired Range is multiplied by a predetermined factor, (in this example a factor of two) in a multiplier 60 and the result is applied to one input of a comparator 62.

The driver selected desired headway from element 50 is also multiplied in a further multiplier 64 with the velocity of the controlled (AICC) vehicle, taken from the vehicle speed sensor 5, to form the Headway Desired Range in element 66. The resulting Headway Desired Range value is presented to the second input of the comparator 62. The comparator 62 provides a high level output in the event that the signal at its second input is less than that at its first input, i.e. when (in this embodiment) the Headway Desired Range is less than twice the Residual Desired Range. In the event of the high level output being present at the comparator 62, an element 68 is actuated to provide an output on a line 70 for the Desired Range equal to:

$$\left(2 \times \text{Residual Desired Range} - \frac{\text{Headway Desired Range}}{2}\right) +$$

Headway Desired Range

On the other hand, if the output of the comparator 62 is at a low level, an inverter 72 provides a high level output to actuate an element 74 to produce an output on the line 70 for the Desired Range equal to the Headway Desired Range.

In summary of the aforegoing:

Headway Desired Range (HD range) (m)=desired headway(sec)× vehicle velocity (m/s)

Residual Desired Range (RD range) (m)=desired headway (sec)× Residual range factor.

$$\begin{vmatrix} | & | & | \\ C=0, S=0 \text{ or } 0=S=0. \\ | & | & | \end{vmatrix}$$

Otherwise: Desired Range=HD range

Thus, in the described embodiment in accordance with the present invention, the Desired Range provided in the known system of FIG. 1 by the Desired Range element 4 to the subtracter 3, is replaced by the Desired Range value established on the line 70 of FIG. 2.

The relationship between Desired Range, Residual Desired range and Headway Desired Range used in the embodiment described above is given by way of example only and other relationships could equally well be adapted, consistent with the principles explained hereinbefore. Likewise the point at which the changeover occurs (HD Range< (2×RD range)) can be varied while operating within the operating principles described herein.

I claim:

1. A cruise control system for controlling the speed of a controlled vehicle in relation to a target vehicle which is running ahead of said controlled vehicle with no other vehicles therebetween, comprising:

DESIRED HEADWAY means having a desired headway request manually input by a driver of the controlled vehicle in order to establish a driver's DESIRED HEADWAY values defined in terms of a desired time interval between said controlled vehicle and said target vehicle;

means for measuring the velocity of said controlled vehicle;

means for multiplying together said driver's DESIRED HEADWAY value and said measured velocity of said controlled vehicle to establish a HEADWAY DESIRED RANGE (HD Range) value;

RESIDUAL RANGE FACTOR means which receives said DESIRED HEADWAY value and which provides at its output a RESIDUAL RANGE factor which increases in proportion to said DESIRED HEADWAY value, but wherein said proportion reduces as said DESIRED HEADWAY value increases;

means for multiplying together said driver's DESIRED HEADWAY value and said RESIDUAL RANGE factor to establish a RESIDUAL DESIRED RANGE (RD Range) value;

means for comparing said HEADWAY DESIRED RANGE value with a value equal to approximately twice the value of said RESIDUAL DESIRED RANGE; and means for establishing a DESIRED RANGE to be targeted by the system wherein said DESIRED RANGE is selected to be equal to said HEADWAY DESIRED RANGE (HD Range) value, unless said HEADWAY DESIRED RANGE value falls below approximately two times said RESIDUAL DESIRED RANGE value, in which case the DESIRED RANGE targeted by the system is selected to be calculated from the expression: DESIRED RANGE=(2×RD Range−HD Range)+HD Range.

$$\text{DESIRED RANGE} = \left(2 \times RD \text{ Range} - \frac{HD \text{ Range}}{2}\right) + HD \text{ Range}$$

* * * * *